United States Patent [19]
Erickson et al.

[11] Patent Number: 5,987,021
[45] Date of Patent: Nov. 16, 1999

[54] METHOD AND APPARATUS FOR ALLOCATING RESOURCES BETWEEN QUEUED AND NON-QUEUED SERVICES

[75] Inventors: Paul M. Erickson, Palatine; Timothy J. Wilson, Schaumburg, both of Ill.

[73] Assignee: Motorola, Inc., Schamburg, Ill.

[21] Appl. No.: 09/089,035

[22] Filed: Jun. 2, 1998

[51] Int. Cl.$^6$ .............................. H04B 7/212; H04J 3/00; H04J 3/02

[52] U.S. Cl. ........................... 370/347; 370/337; 370/462

[58] Field of Search ........................... 370/468, 329–337, 370/347, 433, 462

[56] References Cited

U.S. PATENT DOCUMENTS

| | | | |
|---|---|---|---|
| 5,299,199 | 3/1994 | Wilson et al. | 370/95.3 |
| 5,497,371 | 3/1996 | Ellis et al. | 370/60 |
| 5,533,029 | 7/1996 | Gardner | 370/94.1 |
| 5,548,631 | 8/1996 | Krebs et al. | 379/58 |
| 5,555,244 | 9/1996 | Grupta et al. | 370/60.1 |
| 5,619,647 | 4/1997 | Jardine | 395/200.01 |

OTHER PUBLICATIONS

Algorithm to Provide Dynamic Channel Allocation of 3:1 Resources By Patrick J. Keegan, Matthew W. Simpson and Gary J. Goethals, Motorola Technical Developments, vol. 32, Sep. 1997.

*Primary Examiner*—Douglas W. Olms
*Assistant Examiner*—David Vincent
*Attorney, Agent, or Firm*—Christopher P. Moreno; Steven A. May

[57] ABSTRACT

In a resource allocator (106), a reserved resource group comprising at least one communication resource is maintained for use in supporting non-queued services. When a request for the at least one non-queued service is received, a communication resource from the reserved resource group is allocated to the request (305). When the reserved resource group becomes depleted, at least one more communication resource is assigned to the reserved resource group with greater preference relative to allocation of communication resources to requests for at least one queued service (307). In a preferred embodiment, a communication resource is assigned to the reserved resource group prior to allocating resources to any queued service requests. Additionally, communication resources (200) having varying grades of service can be accommodated.

28 Claims, 2 Drawing Sheets

METHOD AND APPARATUS FOR ALLOCATING RESOURCES BETWEEN QUEUED AND NON-QUEUED SERVICES

FIELD OF THE INVENTION

The present invention relates generally to wireless communication systems and, in particular, to a method and apparatus for allocating resources between queued and non-queued services provided therein.

BACKGROUND OF THE INVENTION

Wireless communication systems capable of supporting multiple types of communication services are known in the art. For example, U.S. Pat. No. 5,548,631 entitled METHOD AND APPARATUS FOR SUPPORTING AT LEAST TWO COMMUNICATION SERVICES IN A COMMUNICATION SYSTEM, issued Aug. 20, 1996 to Krebs et al. and assigned to Motorola, Inc., describes a communication system that supports both telephone and dispatch services. Dispatch services and telephone services differ in a variety of ways from one another, and certain problems can be encountered when providing common infrastructure to support both services. For example, regardless of which service is requested, sufficient communication resources (typically, radio frequency (RF) channels, time slots, etc.) may not be available to immediately support the request. When this occurs in a dispatch context, the request is typically queued indefinitely and the dispatch user is notified upon subsequent availability of the required resource. Contrary to this, a request for a telephone call is typically not queued and the telephone user is not subsequently advised of resource availability. Although these methods of operation are in accordance with user expectations, they can lead to inefficiencies in system resource utilization.

In particular, in a wireless communication system using shared resources in which one or more services are queued and one or more services are non-queued, over time the queued service(s) will tend to monopolize system resources as they become available. As a result, the perceived quality of service for the non-queued services, particular with regard to service availability, decreases. To illustrate using the dispatch/telephone system described above, because dispatch requests are queued, they will tend to occupy all available system resources given that the "persistence" of telephone requests is negligible in comparison. U.S. Pat. No. 5,457,735 entitled METHOD AND APPARATUS FOR QUEUING RADIO TELEPHONE SERVICE REQUESTS, issued Oct. 10, 1995 to Erickson and assigned to Motorola, Inc., describes a solution to this problem in which telephone requests are queued for a finite period of time, thereby increasing the probability that such requests will be provided resources. Additionally, U.S. Pat. No. 4,612,415 entitled DYNAMIC CONTROL OF TELEPHONE TRAFFIC IN A TRUNKED RADIO SYSTEM, issued Sep. 16, 1986 to Zdunek et al. and assigned to Motorola, Inc., describes another solution in which dispatch access delay is continuously measured over succeeding 15 minute intervals. Based on the dispatch access delay measured during a prior 15 minute interval, a number of communication resources reserved to support dispatch service is adjusted for the next 15 minute interval. This process is continuously repeated while the system is in service.

Still another approach to this problem is to partition the system resources in a predetermined manner so that no one service can dominate the resources at the expense of the other services. In one approach referred to as "hard" partitioning, the resources are partitioned in accordance with historical usage of the respective services such that requests for each type of service can only be fulfilled from the designated portion of resources. For example, if, in a given system, 70% of system capacity is historically used to service dispatch requests, with the remaining 30% used to service telephone requests, the system resources will likewise be partitioned on a 70/30 basis. This works well so long as the actual system load stays at 70% dispatch and 30% telephone. However, should the amount of dispatch requests decrease, the otherwise unused resources assigned to support dispatch cannot be used to support an increase in telephone services. Conversely, should the amount of dispatch requests increase, the system cannot assign additional resources to support the increased requests. These inefficiencies likewise apply to increases and decreases in telephone requests.

A somewhat "softer" variant of hard partitioning is to always maintain a minimum number of resources for a given service. For example, at system set-up, the resource allocator in the system would be configured to ensure that no less than N resources (where, typically, N>1) are available and/or in use to support a given service. As a result, the given service will always be guaranteed a minimum level of resources for use in supporting requests for that service, thereby ensuring at least a minimum level of service at all times. Should the number of requests for that service increase such that the N resources are not enough to support all requests immediately, the system is free to assign additional resources, if available, to service the additional requests. However, it is still possible that there are more than enough reserved idle resources to meet the demand for that service at any given time. As a result, resources that may be put to better use in support of other services remain unused in order to maintain the required minimum number for the given service. In effect, both the hard partitioning and minimum number methods work well so long as the offered system load at any given time matches the historical load upon which the partitioning/minimum thresholds are based, but both introduce inefficiencies when the offered load varies from the historical basis.

The problems described above are further exacerbated when the communication resources themselves provide varying grades of service and where different services require communication resources having minimum grades of service. This is particularly true where requests for non-queued services must be fulfilled using resources having a higher grade of service and where requests for queued services may be fulfilled using either lower or higher grade resources. Therefore a need exists to better accommodate the ability of non-queued services to obtain requested resources in a multi-service shared infrastructure communications system.

DESCRIPTION OF A PREFERRED EMBODIMENT

Generally, the present invention provides a method and apparatus for allocating resources between at least one queued service and at least one non-queued service. In particular, a reserved resource group comprising at least one communication resource is maintained for use in supporting the non-queued services. In effect, the reserved resource group does not rely upon historical usage patterns, but rather tracks the current system load distribution at all times. When a request for the at least one non-queued service is received, a communication resource from the reserved resource group is allocated to the request. If the reserved resource group becomes depleted as a result, at least one more communication resource is assigned to the reserved resource group with greater preference relative to allocation of communication resources to requests for the at least one queued service. In a preferred embodiment, the greater preference is effectuated by assigning a communication resource to the reserved resource group prior to allocating resources to any queued service requests. Furthermore, the method can accommodate communication resources having varying grades of service. In a preferred embodiment, the method is carried out by a resource allocator. In this manner, the present invention ensures maximum resource usage efficiency while maintaining perceived system quality, particularly system availability.

Figure 1:
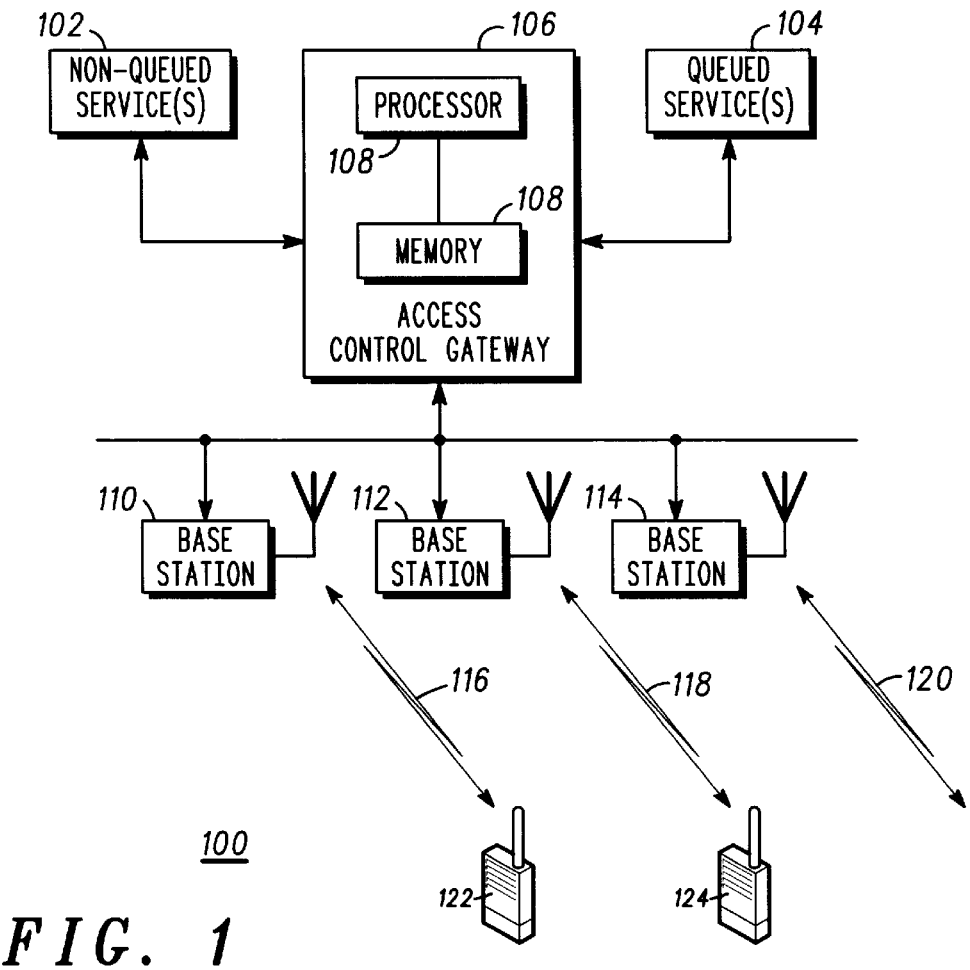
FIG. 1 is a block diagram of a wireless communication system in accordance with the present invention.

The present invention may be more fully described with reference to FIGS. 1–3 and accompanying text. FIG. 1 illustrates a wireless communication system 100 comprising a resource allocator (access control gateway or ACG) 106 configured in accordance with the present invention and coupled to at least one non-queued service processor 102 supporting at least one non-queued service and at least one queued service processor 104 supporting at least one queued service. Communications systems supporting multiple services are known in the art, an example of which is described in U.S. Pat. No. 5,548,631 entitled METHOD AND APPARATUS FOR SUPPORTING AT LEAST TWO COMMUNICATION SERVICES IN A COMMUNICATION SYSTEM, issued Aug. 20, 1996 to Krebs et al. and assigned to Motorola, Inc., which patent is incorporated herein by this reference.

The at least one queued service may comprise, but is not limited to, dispatch services, as known in the art. Likewise, the at least one non-queued service may comprise, but in not limited to, telephone service, control service and mobility service, as known in the art. In order to provide the queued and non-queued services to subscriber units 122–124, the resource allocator 106 is coupled to a plurality of radio base stations 110–114 which transceive a plurality of communication resources 116–120 such as RF carriers supporting frequency-division multiplexed (FDM), time-division multiplexed (TDM) and/or code-division multiplexed (CDM) protocols. The resource allocator 106 includes a processor 107 (such as a computer, microprocessor, microcontroller, digital signal processor or combination thereof as known in the art) coupled to memory 108 (such as volatile and non-volatile memory devices, as known in the art) suitable for storing software programming instructions and/or operating parameters.

In this particular embodiment, the resource allocator 106 determines the radio services requested by the subscriber units 122–124, via the base stations 110–114 and relays the request to the appropriate processor 102–104. To support the request for radio service, the resource allocator 106 receives service approval messages from the processors 102–104 and relays this information to the subscriber units 122–124 via the base stations 110–114. Additionally, the resource allocator 106 issues communication resource assignments to the subscriber units 122–124 via the base stations 110–114.

Operation of the resource allocator 106 is described in further detail below with reference to FIG. 3.

Figure 2:
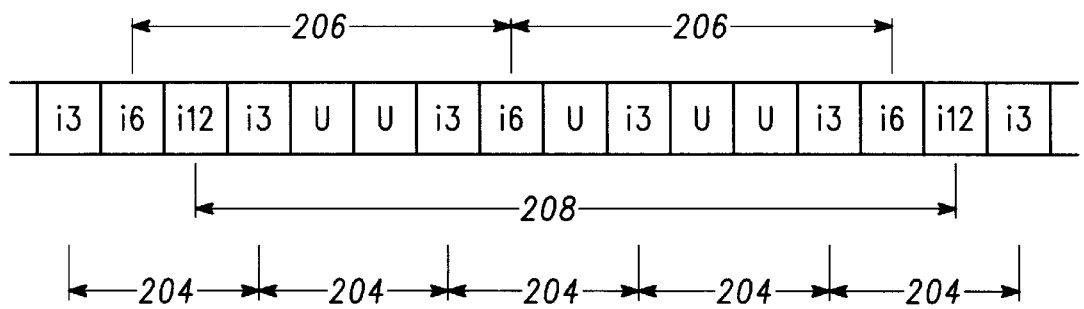
FIG. 2 is a schematic diagram illustrating communication resources having a time slot structure in accordance with a preferred embodiment of the present invention.

Communication resources 200 having a time slot structure in accordance with a preferred embodiment of the present invention are illustrated in FIG. 2. In the preferred embodiment, a carrier frequency is divided into 15 ms. time slots. As used in the preferred embodiment, a communication resource comprises a periodically repeating time slot (labeled "iN" representing a periodicity of every N'th time slot) defined by a predetermined interleave 204–208. For example, in FIG. 2, three different communication resources are depicted, labeled i3, i6 and i12, respectively. The i3 resource has an interleave 204 of three slots; the i6 resource has an interleave 206 of 6 slots; and the i12 resource has an interleave 208 of 12 slots. The time slots labeled "U" are currently unused in the example shown. The time slot structure shown and described is used in "IDEN" communication systems manufactured by Motorola, Inc. As used in "IDEN" systems, communication resources having a lower interleave value are considered to provide a higher (first) grade of service (due to increased frequency of time slots) than resources having a higher interleave value and hence a lower (second) grade of service. As those having ordinary skill in the art will recognize, a variety of communication resources having varying interleaves could be implemented.

Additionally, in the preferred embodiment, resources can be converted from one grade to the other. Referring to FIG. 2, the higher grade i3 resource can be converted into two lower grade i6 resources. Conversely, two lower grade i6 resources can be converted into one higher grade i3 resource, assuming proper alignment of time slots of the two i6 resources. Once again, those having ordinary skill in the art will recognize that other types of convertible higher and lower grade communication resources could be defined.

Figure 3:
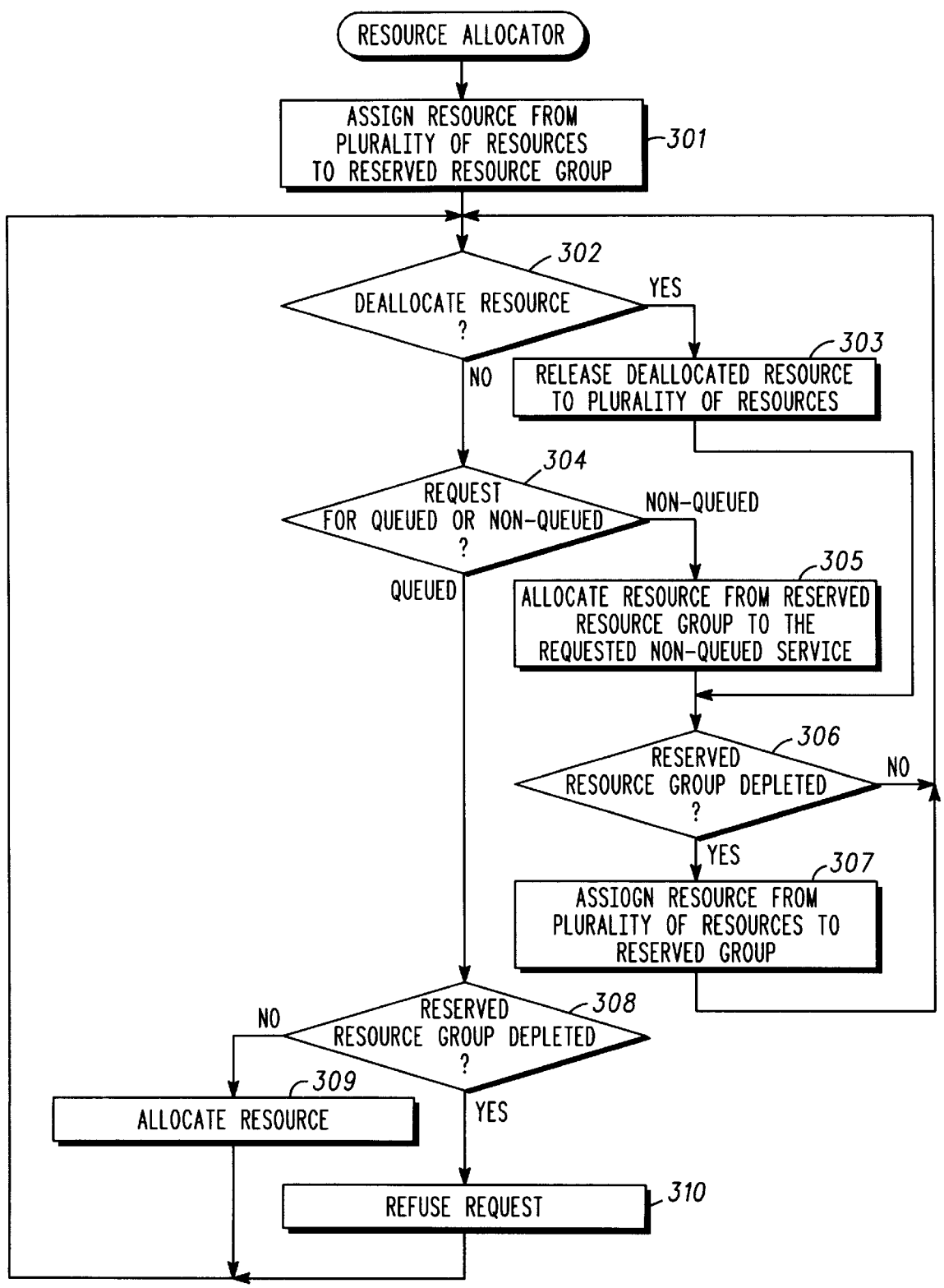
FIG. 3 is a flowchart of a method for use in a resource allocator in accordance with a preferred embodiment of the present invention.

Referring now to FIG. 3, a flowchart of a method for use in a resource allocator in accordance with a preferred embodiment of the present invention is depicted. In the preferred embodiment, the steps illustrated in FIG. 3 and described below are implemented as software routines executed by a resource allocator 106, as known in the art. Alternatively, it is recognized that implementation of the method may be distributed amongst various platforms depending on the architecture of the communication system. Regardless, the method begins at step 301 where at least one communication resource from a plurality of communication resources is assigned to a reserved resource group used to support non-queued services. The communication resources may take a variety of forms such as periodically repeating time slots (as in the preferred embodiment), distinct carrier frequencies, orthogonal codes, etc.

The present invention draws a distinction between resources that are assigned and resources that are allocated. In particular, an allocated resource is a resource that has been designated for use in an ongoing communication and is therefore currently unavailable to support other communications regardless of the type of service. In contrast, an assigned resource is a resource that has been designated for use in a future communication of a given type, and is therefore currently unavailable to support types of services other than the given type. Thus, the reserved resource group, after step 301, is essentially a list of one or more communication resources reserved for later use in support of non-queued services. Until allocated, the communication resources within the reserved resources group remain idle. Furthermore, in the preferred embodiment, the at least one communication resource assigned at step 301 provides the first grade of service, as described above.

Steps 302 and 303 illustrate the preferred method for handling the deallocation of communication resources, i.e., resources that become available as ongoing communications are concluded. When, at step 302, it is determined that one or more resources have become deallocated, the deallocated resources are released back into the plurality of communication resource at step 303, as opposed to being immediately assigned to the reserved resource group. This serves the purpose of allowing the resource allocator the chance to "churn" the communication resources being assigned to the reserved resource group, thereby continually optimizing channel configuration.

Assuming that a resource has not been deallocated, the process continues at step 304 where it is determined whether a request for service, either queued or non-queued, has been received. Of course, if no request for any service has been received, there is no need to allocate any resources and the process can continue at step 302. However, when a request for a non-queued service is received at step 304, the resource allocator (after having received the necessary service approval messages from the service processor supporting the requested non-queued service) allocates a communication resource from the reserved resource group in support of the requested non-queued service at step 305. In effect, this means that the allocated resource is removed from the list designating the reserved resource group.

At step 306, it is determined whether the reserved resource group has been depleted. As shown in FIG. 3, this determination is made whenever a resource has been deallocated or after a resource has been allocated from the reserved resource group. In the context of the present invention, the reserved resource group is "depleted" when it is less than full. When the reserved resource group comprises only a single resource at any time, the allocation of that single resource will obviously deplete the reserved resource group. If the reserved resource group is not depleted, processing continues at step 302.

However, if the reserved resource group does become depleted, at least one other communication resource of the plurality of communication resources is assigned to the reserved resource group with a greater preference relative to allocation of resources to queued service requests at step 307.

In the preferred embodiment, this "greater preference" is achieved by assigning the at least one other resource before allocating any resource to queued service requests. Where resources having first and second grades of service are available, a further refinement is possible in that only a resource having the first grade of service is assigned to the reserved resource group prior to allocating a resource having the second grade of service to a queued service request.

It is recognized that other criteria for assigning the at least one other resource could be used. For example, assignment to the reserved resource group could take priority only over allocation of resources to non-priority (e.g., non-emergency) queued service requests. Alternatively, only users of non-queued services that have paid an extra premium for an overall higher grade of service may be given preference. Other examples are no doubt easily conceived by those having ordinary skill in the art. At a minimum, the criteria used must ensure that non-queued service requests will not be starved of resources by queued service requests.

In order to assign the at least one other resource to the reserved resource group, the resource allocator may select a currently unused communication resource from the plurality of communication resources. However, an unused resource may not always be available at any given moment. In the preferred embodiment, this occurrence causes queued requests to be blocked while waiting for deallocation of resources. Alternatively, it is anticipated that the resource allocator could pre-empt usage of communication resource (s) in one or more currently ongoing communications. For example, low-priority calls could be terminated and the now-available resources used to fulfill the necessary assignment to the reserved resource group.

In yet another alternative, an ongoing communication could have its resource re-allocated to it such that no interruption in service is experienced, but such that a communication resource that was otherwise unavailable is now free. This is possible, in the preferred embodiment, by converting a high grade communication resource (e.g., an i3 resource) into two lower grade resources (e.g., two i6 resources), with one lower grade resource re-allocated to the ongoing communication, and the other lower grade resource now available for assignment. Additionally, it may be possible to re-arrange the order of the time slots used to provide the communication resources such that an additional higher grade resource is realized from previously idle lower grade resources.

By assigning resources to the reserved resource group with greater preference relative to allocation to queued services, the present invention effectively allows the resource allocator to keep just ahead, but not too far ahead, of the need for resources to support the non-queued services. Rather than pre-reserving a plurality of resources that may not be enough, or that may be more than enough, to service the current demand for non-queued services, the present invention effectively tracks the current system loading and provides just enough reserved resources to support the non-queued services.

If, at step 304, a request for a queued service is received, the process proceeds to step 308 where it is first determined whether the reserved resource group is depleted. In the preferred embodiment, requests for queued services that only use resources having the second grade of service are allocated resources only when the reserved resource group is not depleted. Thus, if the reserved resource group is not depleted, a communication resource is allocated to the request for the queued service at step 309. The communication resource allocated at step 309 may be obtained from the plurality of communication resources, i.e., those resources currently unused and not assigned to the reserved resource group. Alternatively, as discussed in the example below, the allocated resource may be obtained from a "holdback" (analogous to the reserved resource group discussed above) created specifically for that purpose. If, however, the reserved resource group is depleted, the request is refused at step 310, after which the request remains queued.

The improvement offered by the present invention may be best illustrated by way of an example. A simulation of the above-described method in a dispatch/telephone system has been implemented according to the following parameters. First, it is assumed that dispatch service requests are queued, whereas telephone and control service requests are not. Second, telephone service requests may be fulfilled using communication resources having either a higher grade of service (i3 channels) or a lower grade of service (i6 channels), although dispatch requests can only be fulfilled using the lower grade resources (i6 channels). As a result, it is necessary to ensure the availability of i3 resources for use in telephone service. Third, control services only require the lowest grade of resources (i12 channels). Finally, in order to create a higher grade resource (i3) when none are available, two lower grade resources (two i6's) with the proper alignment must be converted.

In the simulation, three reserved resource groups (or holdbacks) were created, called "i3hold", "i6hold" and "i12hold". The minimum number of resources to be maintained in each holdback is governed by a minimum threshold value for each, respectively labeled "min3", "min6" and "min12". Thus, on startup, the pseudo-code illustrated in Table 1 is carried out.

TABLE 1

Holdback Initialization.

```
while (number of resources in i3hold < min3)
    get i3 and put into i3hold
while (number of resources in i6hold < min6)
    get i6 and put into i6hold
while (number of resources in i12hold < min12)
    get i12 and put into i12hold
```

When a request for an i3 resource for telephone service is received, it is provided in accordance with Table 2.

TABLE 2

Allocating i6 for telephone.

```
if (min3 = 0)
    get i3
else
    get i3 from i3hold
    goto MaintainHoldbacks
```

As shown in Table 2, if the i3 holdback is disabled (min3=0), then get the resource directly from the plurality of resources. Otherwise, get the resource from the i3 holdback. Regardless, once the i3 resource has been allocated, go to the "MaintainHoldbacks" function which, as described below, serves to restore the holdbacks, if necessary. The process for allocating i12 resources for control services is similar except, of course, that the i12 holdback is used.

When a request for an i6 resource for telephone service is received, it is provided in accordance with Table 3.

TABLE 3

Allocating i6 for telephone.

```
if (min6 = 0)
    if (number of resources in i3hold ≧ min3)
        get i6
else
    get i6 from i6hold
    goto MaintainHoldbacks
```

Thus, when the i6 holdback is disabled (min6=0), the resource allocator will get the resource from the plurality of resources only if the i3 holdback is not depleted. If the i3 holdback is depleted, the i6 request is denied. Alternatively, if the i6 holdback is not disabled, the i6 resource is taken from the i6 holdback. In either case, MaintainHoldbacks is called to replenish the respective holdbacks as needed. By denying the i6 request when the i3 holdback is depleted, the resource allocator allows an i3 resource to become available and assigned to the i3 holdback.

In a similar vein, when a request for an i6 resource for dispatch service is received, it is provided in accordance with Table 4.

TABLE 4

Allocating i6 for dispatch.

```
if (number of resources in i3hold ≧ min3)
    get i6
```

Once again, the request for the i6 resource will be processed only if the i3 holdback has not been depleted. Since dispatch is a queued service, it is not necessary to resort to a holdback to get a resource; if a resource is not currently available from the plurality of resources, the request will remain queued. Note also that MaintainHoldbacks does not need to be called after allocating the i6 resource for dispatch since none of the holdbacks have been affected.

Finally, the functionality of MaintainHoldbacks is as follows:

TABLE 5

Maintain holdbacks function.

```
while (number of resources in i3hold < min3)
    if (can get i3)
        put i3 in i3hold
    else
        break
if (number of resources in i3hold ≧ min3)
    while (number of resources in i6hold < min6)
        if (can get i6)
            put i6 in i6hold
        else
            break
while (number of resources in i12hold < min12)
    if (can get i12)
        put i12 in i12hold
    else
        break
```

Once again, i3 resources are seen to take priority over i6 resources to the extent that no i6 resource will be put into the i6 holdback so long as the i3 holdback is less than full.

In the simulation, a cell comprising three radio frequencies, each supporting time slots as described above relative to FIG. 2, was modeled. A 2% blocking percentage for phone and 5% blocking percentage for dispatch was assumed. The three resource allocation techniques discussed herein were tested: hard partitioning, minimum threshold partitioning, and the present invention. Table 6 illustrates the parameters used in testing each method.

TABLE 6

| Load Mix (fraction dispatch load) | Hard Partition | | Min. Thresholds | | Present Invention | |
|---|---|---|---|---|---|---|
| 0.3 | # i12 | 2 | min i12 | 2 | i12 hold | 1 |
|  | # i6 | 6 | min i6 | 0 | i6 hold | 0 |
|  | # i3 | 5 | min i3 | 5 | i3 hold | 1 |
| 0.5 | # i12 | 2 | min i12 | 2 | i12 hold | 1 |
|  | # i6 | 6 | min i6 | 0 | i6 hold | 0 |
|  | # i3 | 5 | min i3 | 4 | i3 hold | 1 |
| 0.7 | # i12 | 2 | min i12 | 2 | i12 hold | 1 |
|  | # i6 | 8 | min i6 | 0 | i6 hold | 0 |
|  | # i3 | 4 | min i3 | 3 | i3 hold | 1 |

As shown in Table 6, various loading mixes of i3 telephone and i6 dispatch were used. For each loading mix, the operating parameters were manually adjusted to optimize performance for the hard partition and minimum threshold methods; the parameters for the present invention were not altered to track any particular load mix. In particular, the i12 and i3 holdbacks were set to allow for one resource to be assigned to each, whereas the i6 holdback was disabled.

Based on the parameters shown in Table 6, the following results were obtained.

TABLE 7

| Load Mix (fraction dispatch load) | Capacity | | |
| --- | --- | --- | --- |
| | Hard Partition | Min. Thresholds | Present Invention |
| 0.3 | 4.86 | 6.8 | 7.3 |
| 0.5 | 5 | 6.8 | 7.3 |
| 0.7 | 5.57 | 7.2 | 7.5 |

The capacity values shown in Table 7 are expressed in equivalent i6 Erlangs, wherein an i3 call is worth two Erlangs. These results illustrate the improvement offered by the present invention over the prior art method. In all cases, the present invention offers greater system capacity, and therefore better system availability from the viewpoint of a system user. Of particular importance is the fact that the present invention achieves these superior results without the need to adjust the operating parameters to reflect any particular loading mix. This is due to the present invention's ability to essentially keep just ahead (but not too far ahead) of the need for resources to be used in supporting non-queued service requests.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. In a wireless communication system comprising a plurality of communication resources, the wireless communication system supporting a plurality of services that include at least one queued service and at least one non-queued service, a method for allocating resources between the at least one queued service and the at least one non-queued service, the method comprising steps of:

assigning at least one communication resource of the plurality of communication resources to a reserved resource group used for servicing the at least one non-queued service;

allocating a communication resource from the reserved resource group to the at least one non-queued service; and when the reserved resource group is depleted, assigning at least one other communication resource of the plurality of communication resources to the reserved resource group with greater preference relative to allocation of the plurality of communication resources to the at least one queued service.

2. The method of claim 1, wherein the at least one queued service comprises dispatch service.

3. The method of claim 1, wherein the at least one non-queued service comprises at least one of: telephone service, control service and mobility service.

4. The method of claim 1, wherein the plurality of communication resources comprises communication resources providing a first grade of service and communication resources providing a second grade of service inferior to the first grade of service, and wherein the communication resources providing the first grade of service can be converted into the communication resources providing the second grade of service and vice versa.

5. The method of claim 4, wherein the step of assigning the at least one communication resource to the reserved resource group further comprises selecting the at least one communication resource from the communication resources providing the first grade of service.

6. The method of claim 5, further comprising a step of:

allocating a communication resource providing the second grade of service to the at least one queued service only when the reserved resource group is not depleted.

7. The method of claim 1, wherein the step of assigning the at least one other communication resource further comprises assigning the at least one other communication resource prior to allocating any of the plurality of communication resources to the at least one queued service.

8. The method of claim 1, the step of assigning the at least one other communication resource further comprising a step of:

providing the at least one other communication resource by performing at least one of: pre-empting usage of communication resources in an ongoing communication, re-allocating communication resources to the ongoing communication, and blocking one of the plurality of services.

9. The method of claim 1, further comprising steps of:

when any of the plurality of communication resources are deallocated to produce a deallocated communication resource and when the reserved resource group is depleted, releasing the deallocated resource to the plurality of communication resources; and assigning yet another communication resource of the plurality of communication resources to the reserved resource group with greater preference relative to allocation of the plurality of communication resources to the at least one queued service.

10. In a wireless time division multiple access (TDMA) communication system comprising a plurality of periodically repeating time slots forming a plurality of communication resources, the wireless TDMA communication system supporting a plurality of services that include at least one queued service and at least one non-queued service, a method for allocating resources between the at least one queued service and the at least one non-queued service, the method comprising steps of:

assigning a first communication resource of the plurality of communication resources and providing a first grade of service to a reserved resource group used for servicing the at least one non-queued service;

allocating a communication resource from the reserved resource group to the at least one non-queued service; and when the reserved resource group is depleted, assigning at least one other communication resource of the plurality of communication resources and providing the first grade of service to the reserved resource group prior to allocating a second communication resource of the plurality of communication resources to the at least one queued service, wherein the second communication resource provides a second grade of service inferior to the first grade of service.

11. The method of claim 10, wherein the first grade of service corresponds to a first time slot interleave and the second grade of service corresponds to a second time slot interleave greater than the first time slot interleave.

12. The method of claim 10, wherein the at least one queued service comprises dispatch service.

13. The method of claim 10, wherein the at least one non-queued service comprises at least one of: telephone service, control service and mobility service.

14. The method of claim 10, further comprising a step of:
allocating the second communication resource to the at least one queued service only when the reserved resource group is not depleted.

15. The method of claim 10, the step of assigning the at least one other communication resource further comprising a step of:
providing the at least one other communication resource by performing at least one of: pre-empting usage of communication resources in an ongoing communication, re-allocating communication resources to the ongoing communication, and blocking one of the plurality of services.

16. The method of claim 10, further comprising steps of:
when any of the plurality of communication resources are deallocated to produce a deallocated communication resource and when the reserved resource group is depleted, releasing the deallocated resource to the plurality of communication resources; and
assigning yet another communication resource of the plurality of communication resources and providing the first grade of service to the reserved resource group prior to allocating the second communication resource to the at least one queued service.

17. A resource allocator for use in a wireless communication system comprising a plurality of communication resources, the wireless communication system supporting a plurality of services that include at least one queued service and at least one non-queued service, the resource allocator comprising:
means for assigning at least one communication resource of the plurality of communication resources to a reserved resource group used for servicing the at least one non-queued service;
means for allocating a communication resource from the reserved resource group to the at least one non-queued service; and
means for assigning, when the reserved resource group is depleted, at least one other communication resource of the plurality of communication resources to the reserved resource group with greater preference relative to allocation of the plurality of communication resources to the at least one queued service.

18. The resource allocator of claim 17, wherein the plurality of communication resources comprises communication resources providing a first grade of service and communication resources providing a second grade of service inferior to the first grade of service, and wherein the communication resources providing the first grade of service can be converted into the communication resources providing the second grade of service and vice versa.

19. The resource allocator of claim 18, wherein the means for assigning the at least one communication resource to the reserved resource group further comprises means for selecting the at least one communication resource from the communication resources providing the first grade of service.

20. The resource allocator of claim 19, further comprising:
means for allocating a communication resource providing the second grade of service to the at least one queued service only when the reserved resource group is not depleted.

21. The resource allocator of claim 17, wherein the means for assigning the at least one other communication resource assigns the at least one other communication resource prior to allocating any of the plurality of communication resources to the at least one queued service.

22. The resource allocator of claim 17, wherein the means for assigning the at least one other communication resource further comprises:
means for providing the at least one other communication resource by performing at least one of: pre-empting usage of communication resources in an ongoing communication, re-allocating communication resources to the ongoing communication, and blocking one of the plurality of services.

23. The resource allocator of claim 17, further comprising:
means for releasing a deallocated resource to the plurality of communication resources when the reserved resource group is depleted; and
means for assigning yet another communication resource of the plurality of communication resources to the reserved resource group with greater preference relative to allocation of the plurality of communication resources to the at least one queued service.

24. A resource allocator for use in a wireless time division multiple access (TDMA) communication system comprising a plurality of periodically repeating time slots forming a plurality of communication resources, the wireless TDMA communication system supporting a plurality of services that include at least one queued service and at least one non-queued service, the resource allocator comprising:
means for assigning a first communication resource of the plurality of communication resources and providing a first grade of service to a reserved resource group used for servicing the at least one non-queued service;
means for allocating a communication resource from the reserved resource group to the at least one non-queued service; and
means for assigning, when the reserved resource group is depleted, at least one other communication resource of the plurality of communication resources and providing the first grade of service to the reserved resource group prior to allocating a second communication resource of the plurality of communication resources to the at least one queued service, wherein the second communication resource provides a second grade of service inferior to the first grade of service.

25. The resource allocator of claim 24, wherein the first grade of service corresponds to a first time slot interleave and the second grade of service corresponds to a second time slot interleave greater than the first time slot interleave.

26. The resource allocator of claim 24, further comprising:
means for allocating the second communication resource to the at least one queued service only when the reserved resource group is not depleted.

27. The resource allocator of claim 24, wherein the means for assigning the at least one other communication resource further comprises:
means for providing the at least one other communication resource by performing at least one of: pre-empting usage of communication resources in an ongoing communication, re-allocating communication resources to the ongoing communication, and blocking one of the plurality of services.

28. The method of claim 24, further comprising:

means for releasing a deallocated resource to the plurality of communication resources when the reserved resource group is depleted; and means for assigning yet another communication resource of the plurality of communication resources and providing the first grade of service to the reserved resource group prior to allocating the second communication resource to the at least one queued service.

* * * * *